United States Patent [19]

Saito et al.

[11] Patent Number: 4,488,286

[45] Date of Patent: Dec. 11, 1984

[54] SIGNAL-PICKUP CARTRIDGE FOR A ROTARY RECORDING MEDIUM REPRODUCING APPARATUS

[75] Inventors: Takashi Saito, Ayase; Masayoshi Uchida, Yokohama; Masafumi Mochizuki, Yamato; Norimasa Arai, Tokyo, all of Japan

[73] Assignee: Victor Company of Japan, Ltd., Yokohama, Japan

[21] Appl. No.: 383,244

[22] Filed: May 28, 1982

[30] Foreign Application Priority Data

Jun. 2, 1981 [JP] Japan ................................. 56-84717
Jun. 2, 1981 [JP] Japan ................................. 56-84718

[51] Int. Cl.³ .................. G11B 3/10; B65D 81/02; B65D 85/30
[52] U.S. Cl. .................................. 369/292; 206/521; 206/591; 369/170
[58] Field of Search ............... 369/170, 292; 206/592, 206/521

[56] References Cited

U.S. PATENT DOCUMENTS

| 3,572,574 | 3/1971 | Mears | 206/521 |
| 3,853,221 | 12/1974 | Boyd | 206/592 |
| 3,910,411 | 10/1975 | Deeren | 206/592 |
| 3,986,610 | 10/1976 | Hawn | 206/592 |
| 4,019,672 | 4/1977 | Giannini | 206/592 |
| 4,342,394 | 8/1982 | Taylor | 369/170 |
| 4,370,738 | 1/1983 | Coleman | 369/77.2 |

FOREIGN PATENT DOCUMENTS 2300866 7/1974 Fed. Rep. of Germany .

Primary Examiner—Steven L. Stephan
Attorney, Agent, or Firm—Posnack, Roberts, Cohnen & Spiecens

[57] ABSTRACT

A signal-pickup cartridge is adapted to be loaded into a holder of a signal-pickup device proper of a rotating recording medium reproducing apparatus. The signal-pickup cartridge comprises a cantilever having at its distal tip a reproducing element for picking up and reproducing a signal from a rotating recording medium rotating in the apparatus, a cartridge case supporting therewithin the cantilever and having a ceiling plate and vertical walls on opposite sides thereof, a box-shaped cover joinable to the cartridge case to cover the lower face thereof in a manner to protect the cantilever and the reproducing element, and a mechanism for joining the cover and the case in latched state. This mechanism is triggered to unlatch the cover from the case when the cartridge is inserted into the holder.

14 Claims, 16 Drawing Figures

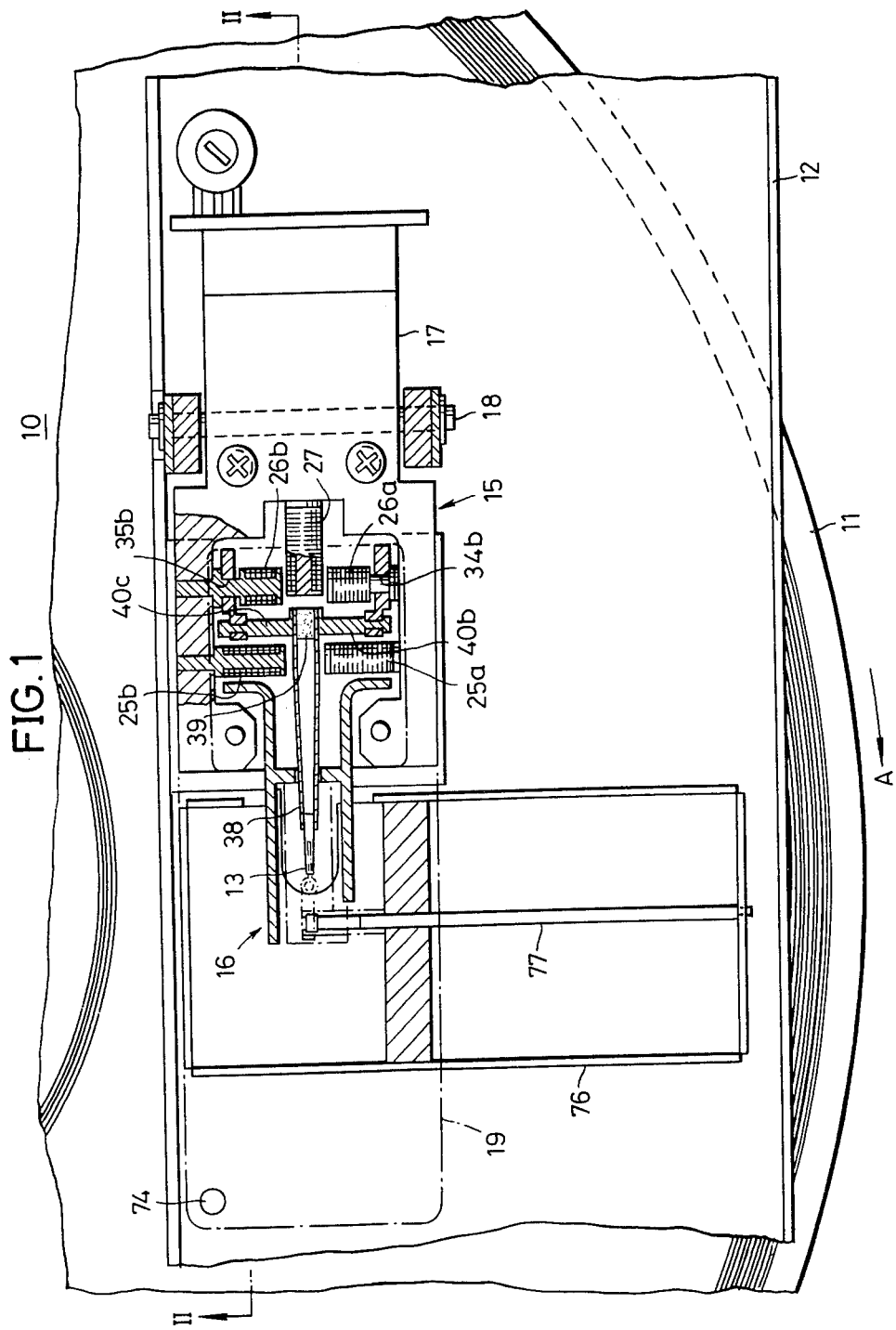

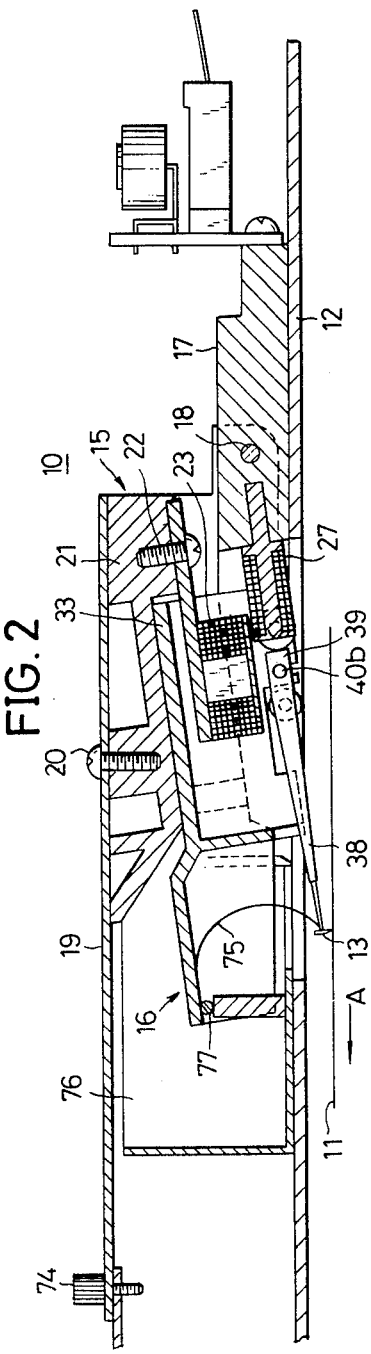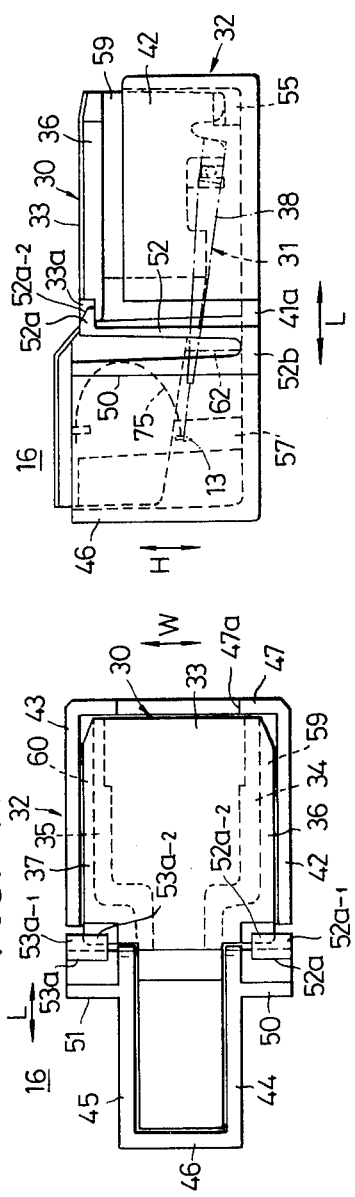

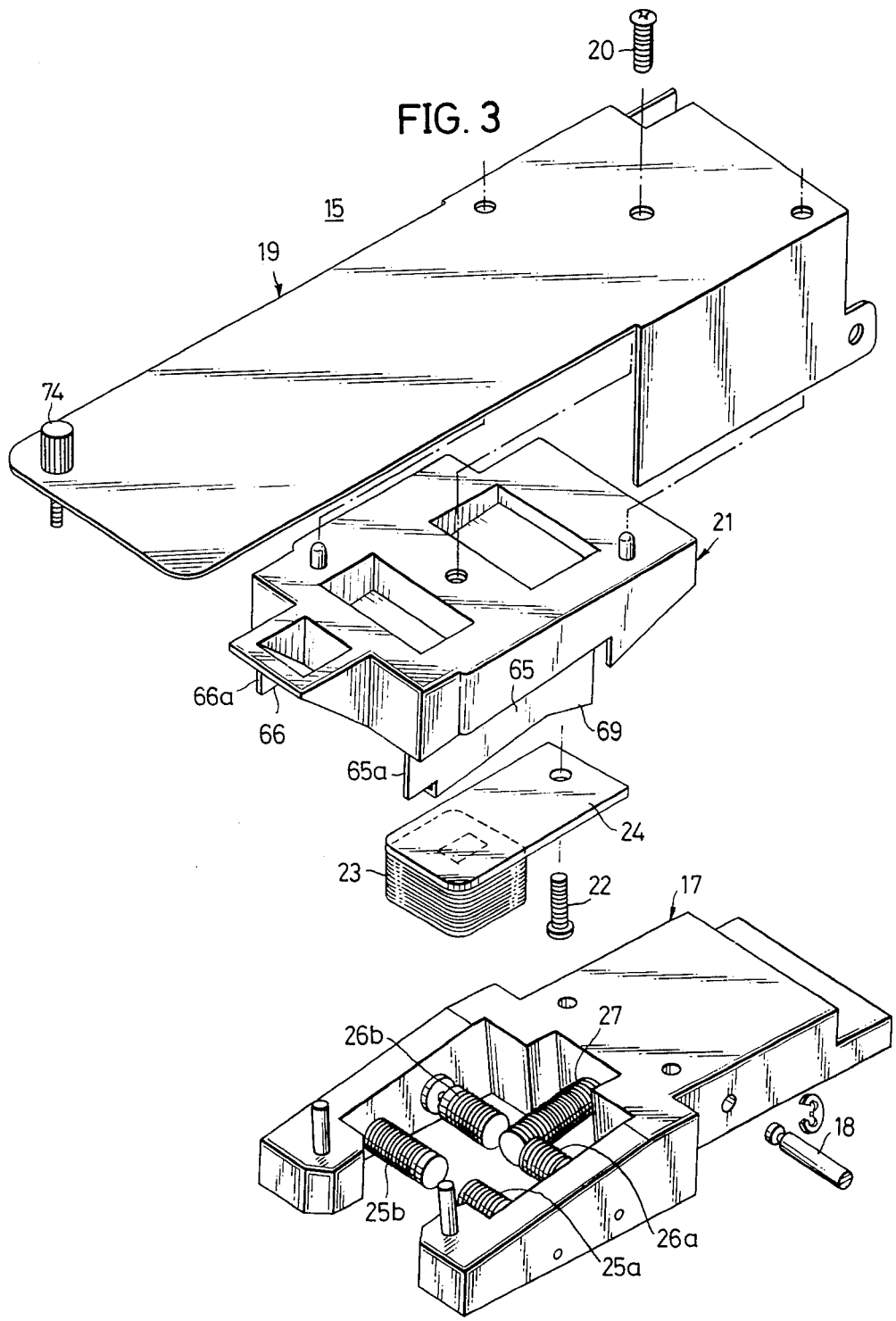

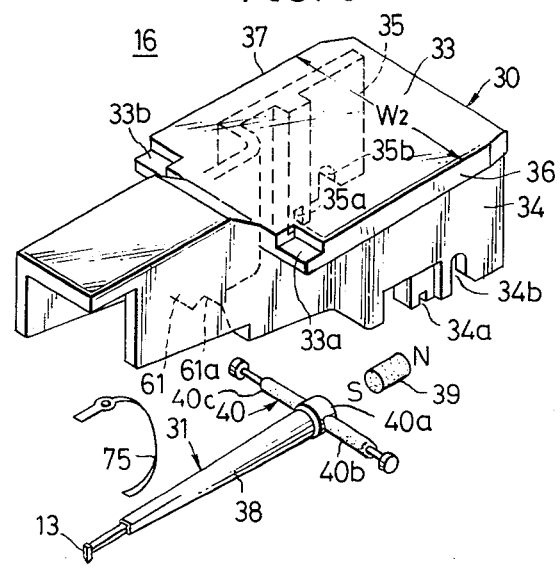
FIG. 5
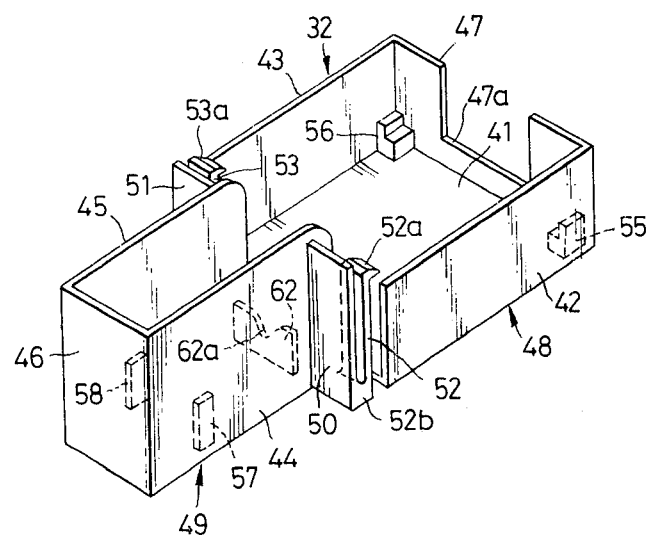

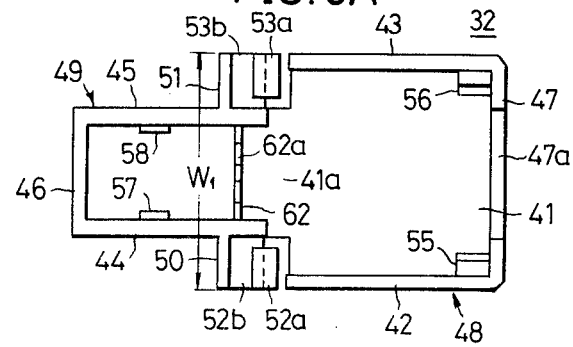

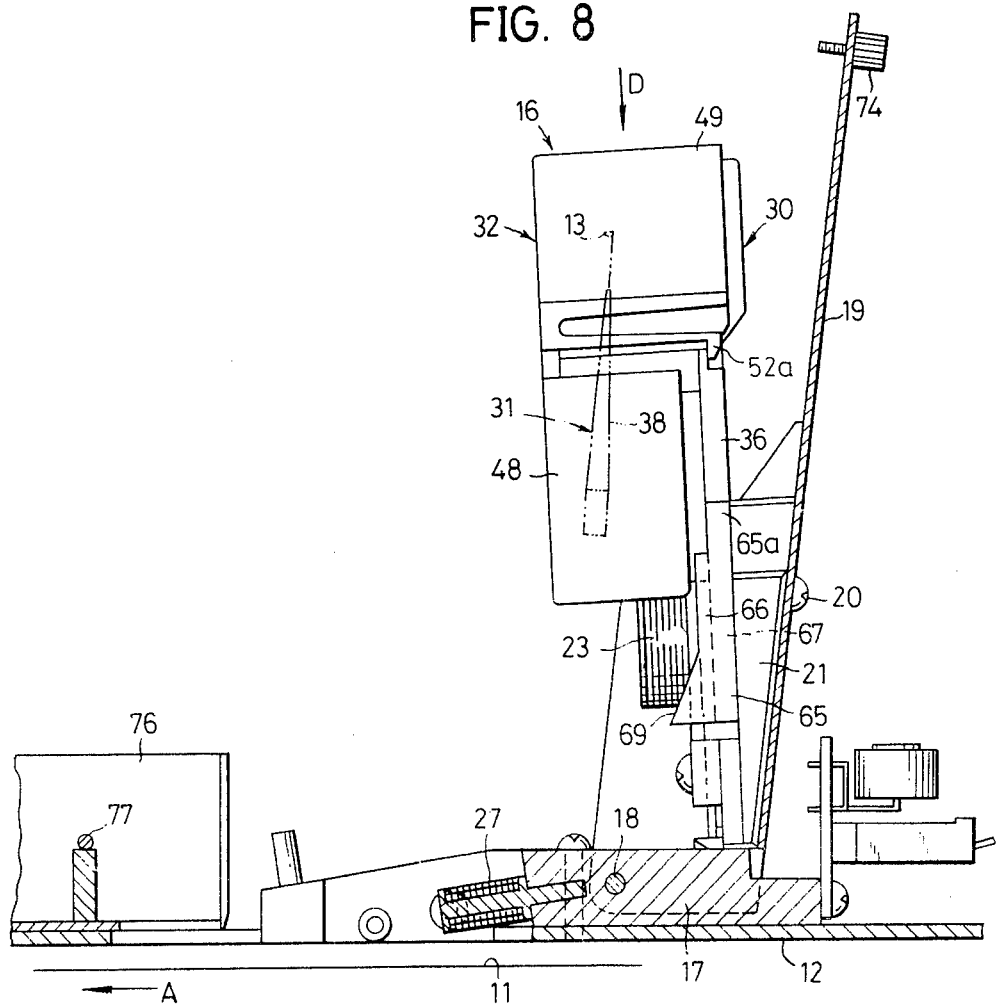

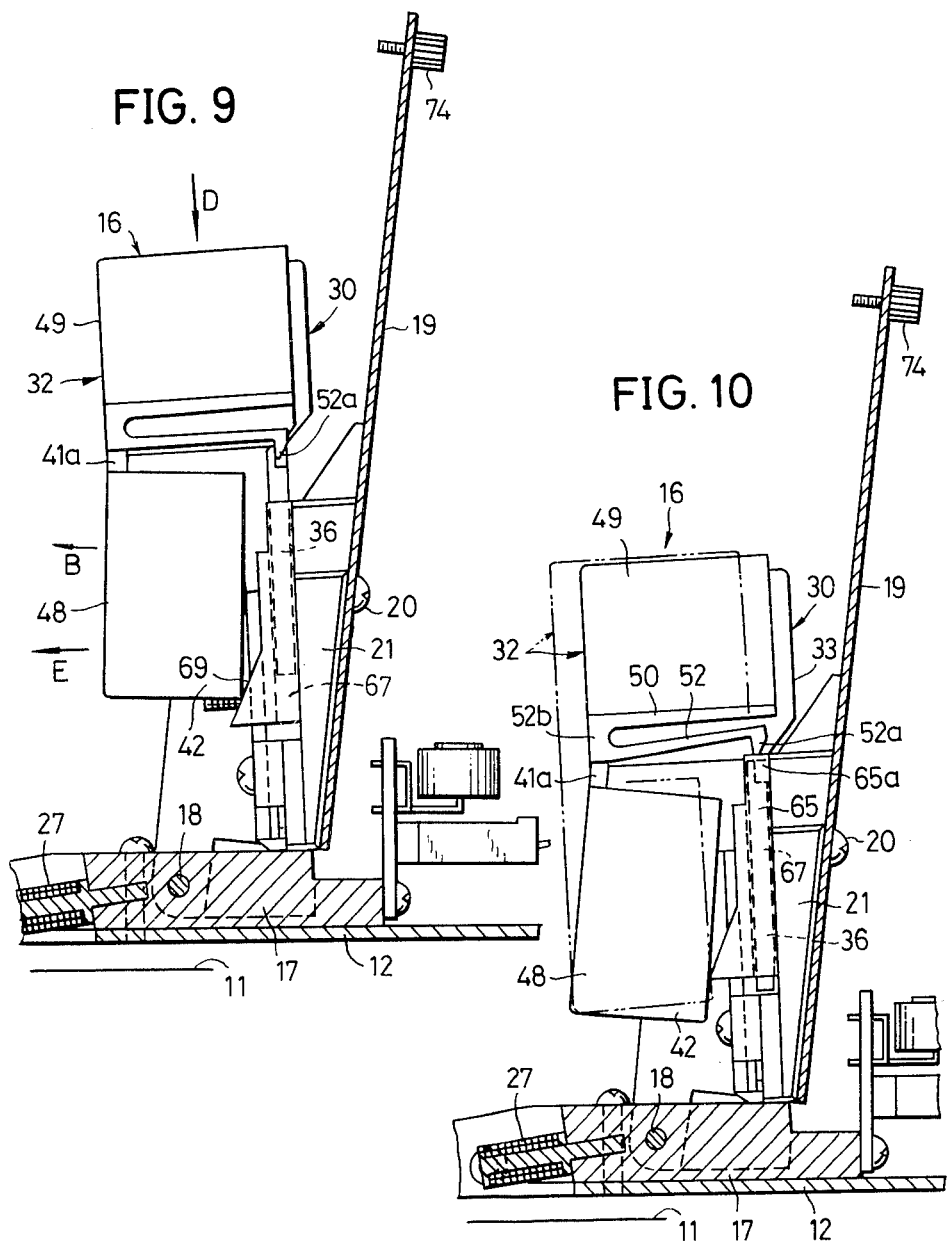

SIGNAL-PICKUP CARTRIDGE FOR A ROTARY RECORDING MEDIUM REPRODUCING APPARATUS

BACKGROUND OF THE INVENTION

This invention relates generally to signal-pickup cartridges into be loaded to signal-pickup devices proper of apparatuses for reproducing signals recorded on rotary recording mediums. More particularly, the invention relates to a signal-pickup cartridge which is capable of positively protecting a reproducing stylus and other parts and is easily and conveniently handled.

A rotary recording medium (hereinafter referred to as a "disc") on which an information signal such as a video signal or an audio signal has been recorded as variations of geometrical shape has been reduced into practice. Also known and being reduced to practice are apparatuses of the type which reproduce from such a disc the thus recorded information in response to variations in the electrostatic capacitance between the disc and the electrode of a reproducing stylus. The signal pickup device used in a reproducing apparatus of this character consists essentially of a signal-pickup device proper comprising a tracking control means provided on the reproducing apparatus, a cartridge loading mechanism, and a signal-pickup cartridge having a reproducing stylus and related parts and loaded from the outside into the cartridge loading mechanism of the pickup device proper.

The assignee of the present application is also the assignee of a previous U.S. patent application Ser. No. 254,055, entitled "Signal pickup device in a rotary recording medium reproducing apparatus". In the specification of this previous application, there is disclosed a signal-pickup cartridge comprising a cartridge case supporting therewithin a cantilever having at its extreme end a reproducing stylus and a rotary lid of openable and closable character which is normally closed to cover the reproducing stylus and is opened at the time of loading. In this pickup cartridge, the rotary lid covers only the reproducing stylus and the extreme end side of the cantilever, and the proximal side of the cantilever is exposed to the outside. For this reason, there has been the problem of the risk of damage to the cantilever during handling and at the time of loading. Furthermore, this pickup cartridge is accompanied by another problem in that it is necessary to rotate the lid in the opening direction at the time of loading, and this means that the loading operation is that much more troublesome.

SUMMARY OF THE INVENTION

Accordingly, it is a general object of the present invention to provide a novel and useful signal-pickup cartridge for a rotary recording medium reproducing apparatus, in which the above described problems have been solved.

Another and more specific object of the present invention is to provide a signal-pickup cartridge provided with a cover which covers the lower face and side faces of a cartridge case holding therewithin a cantilever assembly, and which is automatically disconnected interrelatedly upon the loading of the cartridge into the signal-pickup device proper. In this signal-pickup cartridge according to the invention, the cantilever assembly is positively protected, and accidental damage to the cantilever assembly at the time of handling as an independent article and during loading of the cartridge is prevented. Furthermore, the extra trouble of disconnecting the cover at the time of loading the cartridge into the device proper is eliminated, whereby loading can be accomplished rapidly.

Other objects and further features of the invention will be apparent from the following detailed description when read in conjunction with the accompanying drawings.

BRIEF DESCRIPTION OF THE DRAWINGS

FIG. 1 is a plan view, with some parts in horizontal section, of a signal-pickup device in which a signal-pickup cartridge according to the invention is loaded;

FIG. 2 is a section taken along the line II—II in FIG. 1 as viewed in the direction;

FIG. 3 is an exploded perspective view of the signal-pickup device proper;

FIGS. 4A and 4B are respectively a plan view and a said view orthogonal thereto of one embodiment of the signal-pickup cartridge according to the invention;

FIG. 5 is an exploded perspective view of the signal-pickup cartridge shown in FIGS. 4A and 4B;

FIGS. 6A, 6B and 6C are respectively a plan view, a side view, and an end view showing a cover to be joined to a cartridge case;

FIGS. 7A, 7B, and 7C are respectively an end view, a side view, and a bottom view of a pickup cartridge holder of the signal-pickup device proper;

FIGS. 8, 9, and 10 are side views respectively indicating successive states of the signal-pickup cartridge when it is inserted into the holder of the signal-pickup device proper.

DETAILED DESCRIPTION OF THE INVENTION

Figure 11:
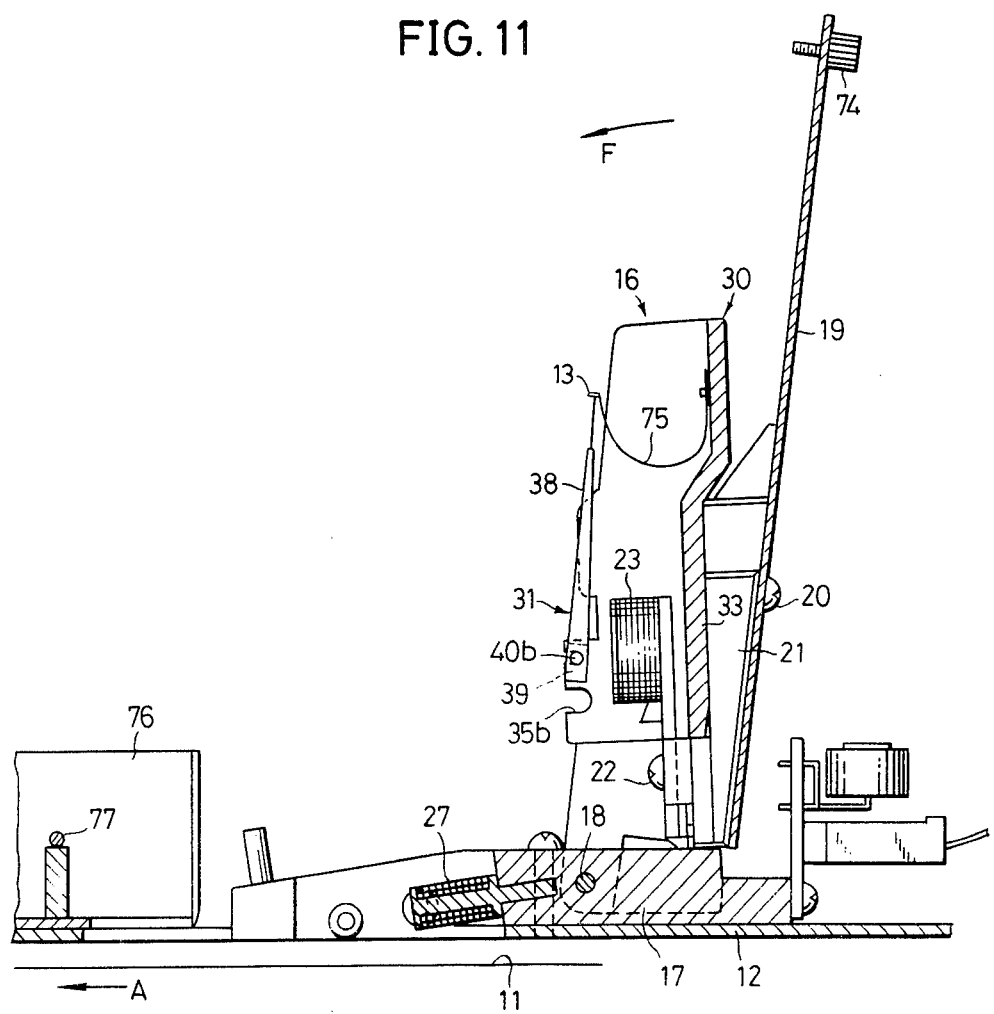
FIG. 11 is a side view indicating the state of the signal-pickup cartridge upon completion of its insertion into the holder.

Referring first to FIGS. 1 and 2, the signal-pickup device 10 of the disc reproducing apparatus is mounted within a carriage 12 which is adapted to travel in the radial direction of a disc 11. This signal-pickup device has a reproducing stylus 13 which traces in relative motion in contact along a track of the disc 11 rotating in the direction of arrow A thereby to reproduce the recorded information signal.

The signal-pickup device 10 comprises a signal-pickup device proper 15 mounted on the carriage 12 and a signal-pickup cartridge 16 according to the invention which is loaded in the device proper 15.

The device proper 15, as shown also in FIG. 3, comprises a coil mounting structure 17 holding a group of coils and fixedly mounted on the carriage 12, a swinging lid 19 made of sheet metal and pivotally supported at one end thereof by pins 18, a pickup cartridge holder 21 secured to the lower surface of the swinging lid 19 by screws 20 and adapted to receive and hold the pickup cartridge 16, and a coil 23 for elevating and lowering the stylus secured to the lower surface of the holder 21 by a screw 22. The swinging lid 19 and the holder 21 pivotally rotate between an open position in which they are approximately upright (in which position the pickup cartridge 16 is inserted or drawn out) and a horizontal closed position (in which the pickup cartridge is loaded).

As shown in FIGS. 4A, 4B, 5, and others, the signal-pickup cartridge 16 comprises a cartridge case 30 made of a synthetic resin, a cantilever assembly 31 mounted within this cartridge case 30, and a cover 32 made of a synthetic resin attached to the cartridge case 30 in a manner to encompass it and functioning cooperatively with the case 30 to protect the cantilever assembly 31.

The cartridge case 30 comprises essentially a ceiling plate 33 and side walls 34 and 35 extending downward therefrom on the two sides thereof. The back side is open. Furthermore, the side edge parts of the ceiling plate 33 extend outward beyond the side walls 34 and 35, thereby being in the form of flanges 36 and 37.

In the cantilever assembly 31, a cantilever 38 supports at its extreme distal end the aforementioned reproducing stylus 13 and at its rear end a permanent magnet 39 of cylindrical shape which has been magnetized in its longitudinal direction. An annular part 40a of an elastic support member (suspension) 40 made of rubber is fitted around the rear end of the cantilever 38. A pair of arm parts 40b and 40c extend coaxially in opposite outward directions from opposite sides of the annular part 40a of the support member 40 and are integrally joined at their inner ends to the annular part 40a. These arm parts 40b and 40c are thus perpendicular to the longitudinal axis of the cantilever 38 and are in the form of trunnions. The cantilever assembly 31 is mounted within the cartridge case 30 by pressing and inserting the arm parts 40b and 40c of the support member 40 into cutouts 34a and 35a formed in the lower edge parts of the side walls 34 and 35 of the case 30.

As shown also in FIGS. 6A, 6B, and 6C, the cover 32 comprises essentially a bottom plate 41 of a shape substantially corresponding to that of the above mentioned ceiling plate 33, vertical side walls 42 and 43 at opposite sides of a wide part of the bottom plate 41, vertical side walls 44 and 45 at opposite sides of a narrow part of the bottom plate 41, and vertical front and rear walls 46 and 47 at the front and rear edges of the bottom plate 41 and has a box-like shape. In the rear wall 47, a cutout 47a for receiving a coil is formed. A feature of this cover 32 is that, as a consequence of deflection of a part 41a in the bottom plate 41, the rear box part 48 can bend elastically in the direction of arrow B in FIG. 6B relative to the front box part 49.

Furthermore, from points near the rear ends of the vertical walls 44 and 45, wing-like walls 50 and 51, respectively, extend outward in opposite directions. Somewhat to the rear of these walls 50 and 51, catch arms 52 and 53, respectively, are provided in upright disposition (as viewed in FIG. 6B) and are integrally joined at their lower root parts 52b and 53b to the lower end parts of the walls 50 and 51. Thus, each wall 50 (or 51), its corresponding catch arm 52 (or 53), and the corresponding connective root part 52b (or 53b) are substantially in the form of the letter U as shown in FIG. 6B. The catch arms 52 and 53 can deflect elastically in the direction of arrow C about their root parts 52b and 53b. The catch arms 52 and 53 are respectively provided at their upper free ends with catch teeth 52a and 53a. The distance $W_1$ between the two catch teeth 52a and 53a, which is the same as the distance between the side walls 42 and 43, is made greater than the width dimension $W_2$ of the ceiling plate 33 of the cartridge case 30.

The pickup cartridge 16 will now be described in greater detail. The cover 32 is fitted from below to the case 30, whereupon the catch teeth 52a and 53a engage notches 33a and 33b in the ceiling plate 33 of the case 30 in a latch-like action. The cover 32 and the case 30 are thereby joined unitarily in a state wherein they cannot be separated in a simple manner. In this state, the bottom plate 41 of the cover 32 covers the entire lower side of the case 30, while its vertical walls 42 through 47 surround the peripheral parts of the case 30. Thus, the cantilever assembly becomes entirely enclosed and hidden and is therefore positively protected.

Furthermore, the rear lower edges of the vertical walls 34 and 35 of the case 30 rest on and are supported by stepped projections 55 and 56 provided on the inner sides of the walls 42 and 43 of the cover 32 at the rear part thereof. At the same time, the front lower edges of the walls 34 and 35 of the case 30 rest on and are supported by projections 57 an 58 provided on the inner sides of the walls 44 and 45 of the cover. Thus, the case 30 is positionally fixed in the cover 32 with respect to the height direction (arrow direction H) and the width direction (arrow direction W). Furthermore, the rear and front edges of the vertical walls 34 and 35 of the case 30 are in abutting contact with the rear and front vertical walls 47 and 46 of the cover 32 and are thus fixed in position within the cover 32 with respect to the longitudinal direction (arrow direction L).

In addition, grooves 59 and 60 extending along the left and right edges of the pickup cartridge 16 are formed between the lower surface of the flanges 36 and 37 of the case 30 and the upper edge surfaces of the vertical walls 42 and 43 of th cover 32. Furthermore, the region of the cantilever 38 near its free tip is held loosely between a cutout 61a of a rib 61 of the case 30 and a cutout 62a of a rib 62 of the cover 32.

When the pickup cartridge 16 is being handled independently as a commodity, the cover is in the state as described above wherein it is joined to the case 30, and the cantilever assembly 38 is maintained in a positively protected state. Furthermore, when the pickup cartridge 16 is being manually handled, the cover 32 is grasped by hand as a natural consequence. Then, since the case 30 is in a state wherein the hand is not touching it except at it ceiling plate 33, there is no possibility of the vertical walls 34 and 35, for which high precision is required in positioning during loading, deflecting or deforming even if the cartridge 16 is handled roughly.

Another safe feature of this pickup cartridge 16 is that the catch teeth 52a and 53a engage with the notches 33a and 33b and do not project out beyond the upper surface of the ceiling plate 33 of the case 30, lying in substantially the same plane as this upper surface of the ceiling plate 33. For this reason, there is no possibility during handling of a finger tip accidently catching against the catch teeth 52a and 53a and unexpectedly causing these to become disengaged and unlatched. Although portions of the catch teeth 52a and 53a project out beyond the flange parts 36 and 37 of the ceiling plate 33 of the case 30 (these outwardly projecting parts $52_{a-1}$ and $53_{a-1}$ having the function of unlatching at the time of loading of the pickup cartridge as described hereinafter), they do not project out beyond the outer surfaces of the walls 42 and 43 of the cover 32 and therefore cannot be easily caught by a finger tip.

Stil another feature of this pickup cartridge 16 is that the catch arms 52 and 53 can be deflected elastically in the direction of arrow C as described hereinbefore, and, in combination with this, the upper parts of the catch teeth 52a and 53a are provided with inclined surfaces $52_{a-2}$, $53_{a-2}$. Accordingly, when the cover 32 is brought against the case 30 to cover the same, or, conversely, when the case 30 is inserted into the cover 32, these inclined surfaces of the catch teeth 52a and 53a strike against the ceiling plate 33 of the case 30 and are deflected forward, as the catch arms 52 and 53 are elastically deflected, until the tips of the catch teeth 52a and 53a over-ride the forward edges of the notches 33a and 33b and click into latched position. Thus, the cover 32 and the case 30 can be joined together in latched state by merely pressing either thereof against the other.

The aforementioned cartridge holder 21 of the signal-pickup device proper 15 is provided at the left and right sides of its lower face with vertical walls 65 and 66 as shown in FIGS. 7A, 7B, and 7C. These walls 65 and 66 have guide grooves 67 and 68 for receiving the flange parts 36 and 37 of the case 30 and have sloping guide parts 69 and 70 declining downward in the far inner part of the lower face. These sloping guide parts 69 and 70 function, when the cartridge is inserted to a position near its final, fully-inserted position, to push down the vertical walls 42 and 43 of the cover 32 so as to separate the cover 32 from the case 30. Furthermore, the outer end parts 65a and 66a of the vertical walls 65 and 66 press relatively against the aforementioned sidewardly projecting parts $52_{a-1}$ and $53_{a-1}$ of the catch teeth 52a and 53a thereby unlatching the catch teeth 52a and 53a from the notches 33a and 33b when the cartridge 16 is inserted into its final, fully-inserted position.

The aforementioned coil 23 is fixed to a base plate 24 which is fitted against stepped parts 71 and 72 in the lower face of the cartridge holder 21 and secured by a screw to a mounting projection 73.

Within the aforementioned coil mounting structure 17, four coils 25a, 25b, 26a and 26b for tracking control and one coil 27 for jitter correction are mounted.

The operation of loading the cartridge 16 into its prescribed loading position will now be described with reference to FIGS. 8, 9, and 10. This loading is accomplished in a motion of two steps namely, insertion and rotation.

First, the swinging lid 19, together with the cartridge holder 21, is rotated to its opened position in which it is substantially upright as shown in FIG. 8. With these parts in this state, the pickup cartridge 16 is held by its cover 32 and, by facing its wide side forward, it is inserted in the direction D into the holder 21. The cartridge 16 is thus inserted into the holder 21 as the flange parts 36 and 37 on opposite sides of the case ceiling plate 33 are slidingly guided by the guide grooves 67 and 68. The coil 23 passes relatively through the cutout 47a in the rear wall 47 of the cover 32 and advances relatively into the case 30 of the cartridge 16.

Then, when the cartridge 19 has been inserted approximately half way and is further inserted, the vertical walls 42 and 43 of the cover ride onto the sloping guide parts 69 and 70 and are forced to move in the direction of arrow E as shown in FIG. 9. At this time, since the cover 32 is still latched to the case 30, the front box part 49 of the cover 32 is maintained in the original state wherein it is fitted onto the case 30, and only the rear box part 48 is partly outside of the corresponding part of the case 30. As a consequence, the cover 32 assumes a state wherein the deflectable part 41a of its bottom plate 41 has been elastically bent, and the box part 48 has been deflected in the direction of arrow B relative to the box part 49, whereby spring energy has been stored to exert a spring force tending to straighten the bottom plate 41.

The cartridge 16 is inserted until the ceiling plate 33 of the case 30 strikes against the mounting projection 73 as shown in FIG. 10. When the cartridge 16 is inserted to its final position, the sidewardly projecting parts $52_{a-1}$ and $53_{a-1}$ of the catch teeth 52a and 53a respectively strike against the front edge parts 65a and 66a of the walls 65 and 66 of the cartridge holder 21 and are relatively pushed thereby. As a consequence, the catch arms 52 and 53 are deflected in the direction of arrow C, and the catch teeth 52a and 53a slip off the ceiling plate 33, whereby the cover 32 becomes unlatched relative to the case 30.

Upon being thus unlatched, the cover 32 is restored to its original shape by the above mentioned spring force due to stored spring energy, and the box part 49 assumes a state as indicated by two-dot chain line in FIG. 10 wherein it is partly displaced out from the corresponding part of the case 30. As a consequence, the cover 32 is ejected and separated from the case 30. This action is distinctly felt by the operator.

Accordingly, the insertion of the cartridge 16 into the holder 21 produces a pleasantly assuring sensation and, moreover, is positively carried out. Furthermore, since the cover 32 is joined to the case 30 until the cartridge inserting operation has been completed, this cartridge inserting operation can be carried out with no possibility of the cantilever assembly 31 being damaged by an outside object.

The state wherein the cartridge 16 has been inserted into the cartridge holder 21 is shown in FIG. 11, in which state the permanent magnet 39 of the cantilever assembly 31 is confronting the coil 23 for elevating and lowering the stylus.

Thereafter, the swinging lid 19 is swung in its closing direction (arrow direction F). The swinging lid 19 is fixed in its horizontal closed position as shown in FIG. 2 by a screw 74 provided with a knob.

As a consequence of the closing action of the swinging lid 19, the cartridge 16 (that is, cantilever assembly 31) is positionally set relative to the coil mounting structure 17 by means of the cutouts 34b and 35b for positioning of the vertical walls 34 and 35 of the case 30.

In addition, a metal ribbon 75 is led out from the reproducing stylus 13 and is pressed against the center conductor 77 of a resonator 76. Thus, the signal-pickup device is constituted as shown in FIGS. 1 and 2.

Further, this invention is not limited to these embodiments but various variations and modifications may be made without departing from the scope of the invention.

What is claimed is:

1. A signal-pickup cartridge adapted to be loaded into a holder of a signal-pickup device proper of a rotary recording medium reproducing apparatus, said signal-pickup cartridge comprising:
a cantilever having at its distal tip a reproducing element for picking up and reproducing a signal from a rotary recording medium rotating in said apparatus;
a cartridge case supporting therewithin the cantilever and having a ceiling plate and vertical walls on opposite sides thereof;
a box-shaped cover joinable to the cartridge case to cover the lower face thereof, said cover including a solid bottom plate which covers the cartridge case in entirety from below and encloses the cantilever within said reproducing element at the distal tip to protect the cantilever and the reproducing element; and means for joining the cover and the case in a latched state so as to prevent the cover from being removed manually, said means being triggered to unlatch the cover from the case so as to permit removal of the cover upon loading of the cartridge into said holder.

2. A signal-pickup cartridge as claimed in claim 1 in which said joining means comprises at least one catch arm formed at one part of the cover and having at its outer free end a catch tooth and a corresponding engagement part provided in the ceiling plate of the case to be engaged and thereby latched by the catch tooth when the cover and the case are in said latched state, the catch tooth being acted upon in relative motion by a part of said holder to be disengaged from the engagement part when the cartridge is inserted into the holder.

3. A signal-pickup cartridge as claimed in claim 2 in which said engagement part is a notch formed in the upper face of the ceiling plate, and, when the catch tooth is in engaged state in the notch, the outer part of the catch tooth is flush in substantially the same plane as the upper surface of the ceiling plate.

4. A signal-pickup cartridge as claimed in claim 2 in which the catch tooth is so disposed that the outer side face thereof lies in the same plane as a lateral side face of the cover.

5. A signal-pickup cartridge as claimed in claim 2 in which the catch tooth has at its upper face a declined surface sloping downward toward the tip end of the catch tooth, and, by pressing the case and cover together in joining the same, the declined surface is pressed and deflected, whereby the catch tooth is once pushed into a retracted state and then clicks into latched state in the notch.

6. A signal-pickup cartridge as claimed in claim 1 in which gaps are formed between the ceiling plate of the case and the cover when the case and cover are joined together, and, at an intermediate point in the insertion of the cartridge into the holder, sloped guide parts of the holder advance in relative motion into the gaps and apply a force urging the cover in a direction to separate away from the case.

7. A signal-pickup cartridge adapted to be loaded into a holder of a signal-pickup device proper of a rotary recording medium reproducing apparatus, said signal-pickup cartridge comprising:

a cantilever having at its distal tip a reproducing element for picking up and reproducing a signal from a rotary recording medium rotating in said apparatus;

a cartridge case supporting therewithin the cantilever and having a ceiling plate and vertical walls on opposite sides thereof;

a box-shaped cover joinable to the cartridge case to cover the lower face thereof in a manner to protect the cantilever and the reproducing element; and means for joining the cover and the case in a latched state, said means being triggered to unlatch the cover from the case when the cartridge is inserted into said holder, said cover comprising, as its principal parts, first and second box-like parts respectively covering, within the case, the proximal side of the cantilever and the reproducing element and a deflectable part between the first and second box-like parts, and, at an intermediate point in the insertion of the cartridge into the holder, the cover being bent at the deflectable part by the action of a sloped guide part of the holder, whereby the first box-like part is deflected elastically relatively to the second box-like part in a direction to separate away from the case to store spring energy, which is released to exert a spring force separating the cover from the case when the cover is unlatched from the case.

8. A signal-pickup cartridge adapted to be loaded into a holder of a signal-pickup device proper of a rotary recording medium reproducing apparatus, said signal-pickup cartridge comprising:

a cantilever having at its distal tip a reproducing element for picking up and reproducing signal from a rotary recording medium rotating in said apparatus;

a cartridge case supporting therewithin the cantilever and having a ceiling plate and vertical walls on opposite sides thereof;

a box-shaped cover joinable to the cartridge case to cover the entire lower face thereof in a manner to protect the cantilever and the reproducing element; and means for joining the cover and the case in a latched state so as to prevent the cover from being removed manually, said means being triggered to unlatch the cover from the case so as to permit removal of the cover upon loading of the cartridge into said holder, said cartridge case comprising a rib having a cutout, said cover comprising a rib having a cutout, both the cutouts cooperating to loosely hold the cantilever at a certan point near its distal tip.

9. A signal-pickup cartridge adapted to be loaded into a holder of a signal-pickup device proper of a rotary recording medium reproducing apparatus, said signal-pickup cartridge comprising:

a cantilever having a distal tip including a reproducing element for picking up and reproducing a signal from a rotary recording medium rotating in said apparatus;

a cartridge case supporting said cantilever therewith and including a ceiling plate and vertical walls on opposite sides thereof;

a box-shaped cover joinable to the cartridge case to cover the lower face thereof to protect the cantilever and the reproducing element;

means joining the cover and the case in a latched state to prevent the cover from being removed manually from the case; and means for unlatching the cover from the case upon insertion of the cartridge into said holder so that the cover can now be removed from the case;

said cover including a part at which the cover is resiliently bendable, the unlatching means including means for resiliently bending the cover at said part upon partial insertion of the cartridge into the holder and means for releasing the cover from the case upon further insertion of the cartridge into the holder whereupon the resiliently bent cover separates from the case.

10. A signal-pickup cartridge as claimed in claim 9 wherein said means for unlatching the cover from the case automatically separates the cover from the case when the cartridge is inserted into the holder.

11. The combination comprising a holder of a signal-pickup device of a rotary recording medium reproducing apparatus and a signal pickup cartridge adapted to be loaded into the holder, said signal-pickup cartridge comprising:
- a cantilever having a distal tip including a reproducing element for picking up and reproducing a signal from a rotary recording medium rotating in said apparatus;
- a cartridge case supporting said cantilever therewith;
- a cover releasably joinable to the cartridge case to cover the lower face thereof to protect the cantilever and the reproducing element; and
- means for releasably joining the cover and the case in a latched state in which the cover is prevented from being removed manually from the case; said holder comprising:
- means for unlatching the cover from the case upon insertion of the cartridge into the holder so that the cover can now be removed from the case;
- said cover including a part at which the cover is resiliently bendable, the latching means including means for resiliently bending the cover at said part upon partial insertion of the cartridge into the holder and means for releasing the cover from the case upon further insertion of the cartridge into the holder whereupon the resiliently bent cover separates from the case.

12. The combination as claimed in claim 11 wherein said means for unlatching the cover from the case automatically separates the cover from the case when the cartridge is inserted into the holder.

13. The combination comprising a holder of a signal-pickup device of a rotary recording medium reproducing apparatus and a signal-pickup cartridge adapted to be loaded into the holder, said signal-pickup cartridge comprising:
- a cantilever having a distal tip including a reproducing element for picking up and reproducing a signal from a rotary recording medium rotating in said apparatus;
- a cartridge case supporting said cantilever therewith;
- a cover releasably joinable to the cartridge case to cover the lower face thereof to protect the cantilever and the reproducing element; and
- means for releasably joining the cover and the case in a latched state in which the cover is prevented from being removed manually from the case;
- said holder comprising:
- means for unlatching the cover from the case upon insertion of the cartridge into the holder so that the cover can now be removed from the case;
- said means for releasably joining the cover and case comprising at least one catch arm on said cover having an outer free end including a catch tooth,
- said case including a corresponding engagment part engageable by said catch tooth to be latched thereby when the cover and the case are in said latched state,
- said unlatching means provided on said holder acting on said catch tooth when the cartridge is inserted into the holder to disengage the catch tooth from said engagement part on the case.

14. The combination comprising a holder of a signal-pickup device of a rotary recording medium reproducing apparatus and a signal pickup cartridge adapted to be loaded into the holder, said signal-pickup cartridge comprising:
- a cantilever having a distal tip including a reproducing element for picking up and reproducing a signal from a rotary recording medium rotating in said apparatus;
- a cartridge case supporting said cantilever therewith;
- a cover releasably joinable to the cartridge case to cover the lower face thereof to protect the cantilever and the reproducing element; and
- means for releasably joining the covering and the case in a latched state in which the cover is prevented from being removed manually from the case, the case and cover being joined together with gaps being formed between the case and the cover, said holder comprising means for unlatching the cover from the case upon insertion of the cartridge into the holder so that the cover can now be removed from the case, and sloped guide parts which, at an intermediate point in the insertion of the cartridge into the holder, advance with relative motion in said gaps and apply a force urging the cover to separate from the case.

* * * * *

UNITED STATES PATENT AND TRADEMARK OFFICE
CERTIFICATE OF CORRECTION

PATENT NO. : 4,488,286
DATED : December 11, 1984
INVENTOR(S) : SAITO et al.

It is certified that error appears in the above—identified patent and that said Letters Patent is hereby corrected as shown below:

In Claim 11, column 9, line 14, delete "said"

in column 9, line 15 change to

-- said holder comprising:-- in column 9, line 20, after "the" change "latching" to

-- unlatching --

*Signed and Sealed this*

*Twenty-third* Day of *July 1985*

[SEAL]

*Attest:*

DONALD J. QUIGG

*Attesting Officer*      *Acting Commissioner of Patents and Trademarks*